Oct. 4, 1932.                J. W. BRYCE                1,880,409
           TRANSLATING DEVICE FOR ACCOUNTING MACHINES
                Filed Sept. 28, 1927    6 Sheets-Sheet 1

Inventor
James W. Bryce
By his Attorney
W. M. Wilson

Oct. 4, 1932.  J. W. BRYCE  1,880,409
TRANSLATING DEVICE FOR ACCOUNTING MACHINES
Filed Sept. 28, 1927  6 Sheets-Sheet 2
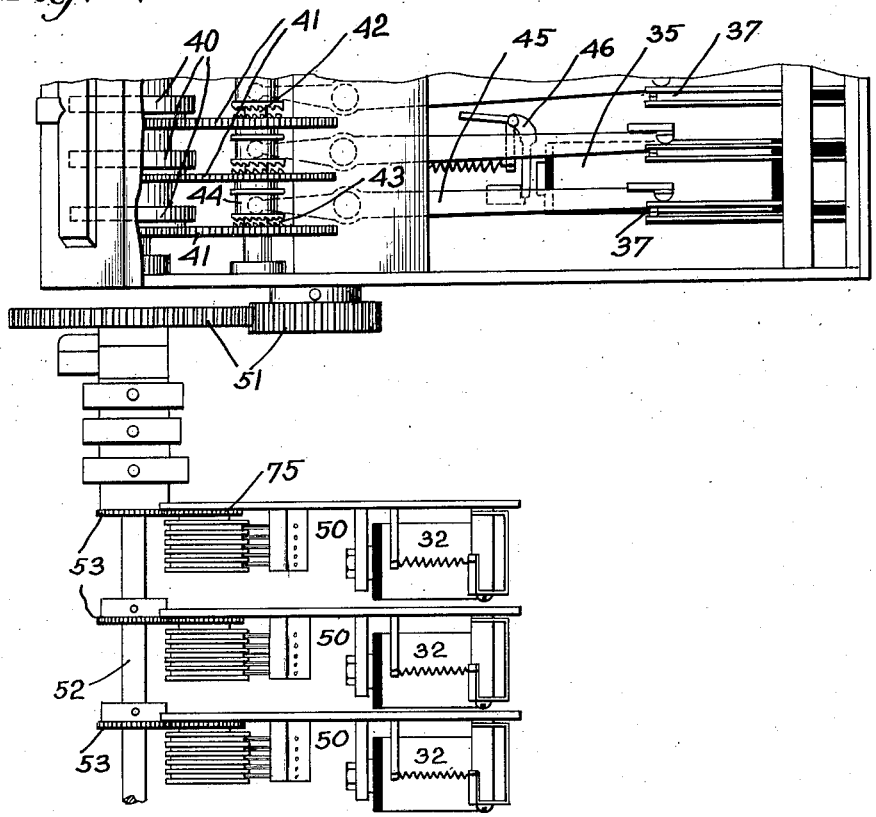
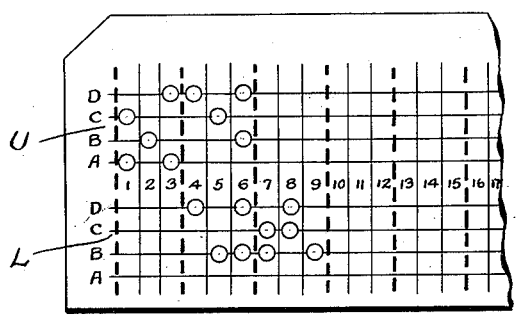
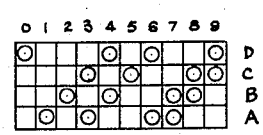

Oct. 4, 1932.  J. W. BRYCE  1,880,409
TRANSLATING DEVICE FOR ACCOUNTING MACHINES
Filed Sept. 28, 1927    6 Sheets-Sheet 3

Inventor
James W. Bryce
By his Attorney
W. W. Wilson

Oct. 4, 1932.  J. W. BRYCE  1,880,409
TRANSLATING DEVICE FOR ACCOUNTING MACHINES
Filed Sept. 28, 1927  6 Sheets-Sheet 4
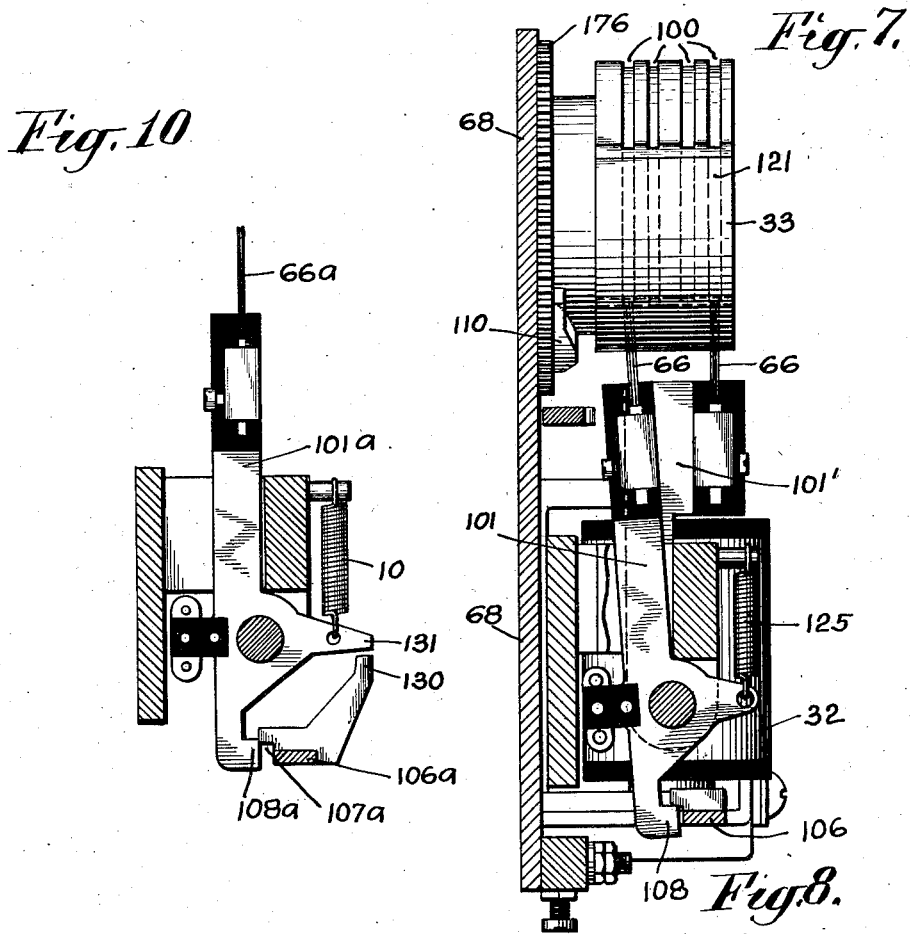
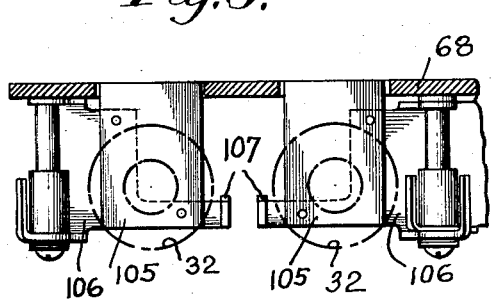
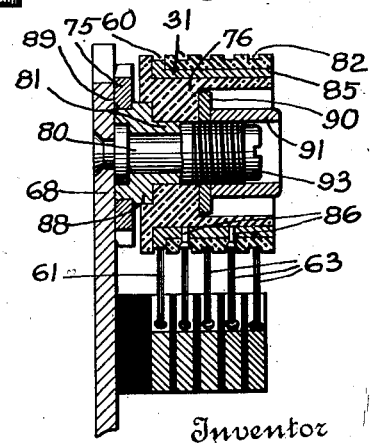
Inventor
James W. Bryce
By his Attorney
W. M. Wilson

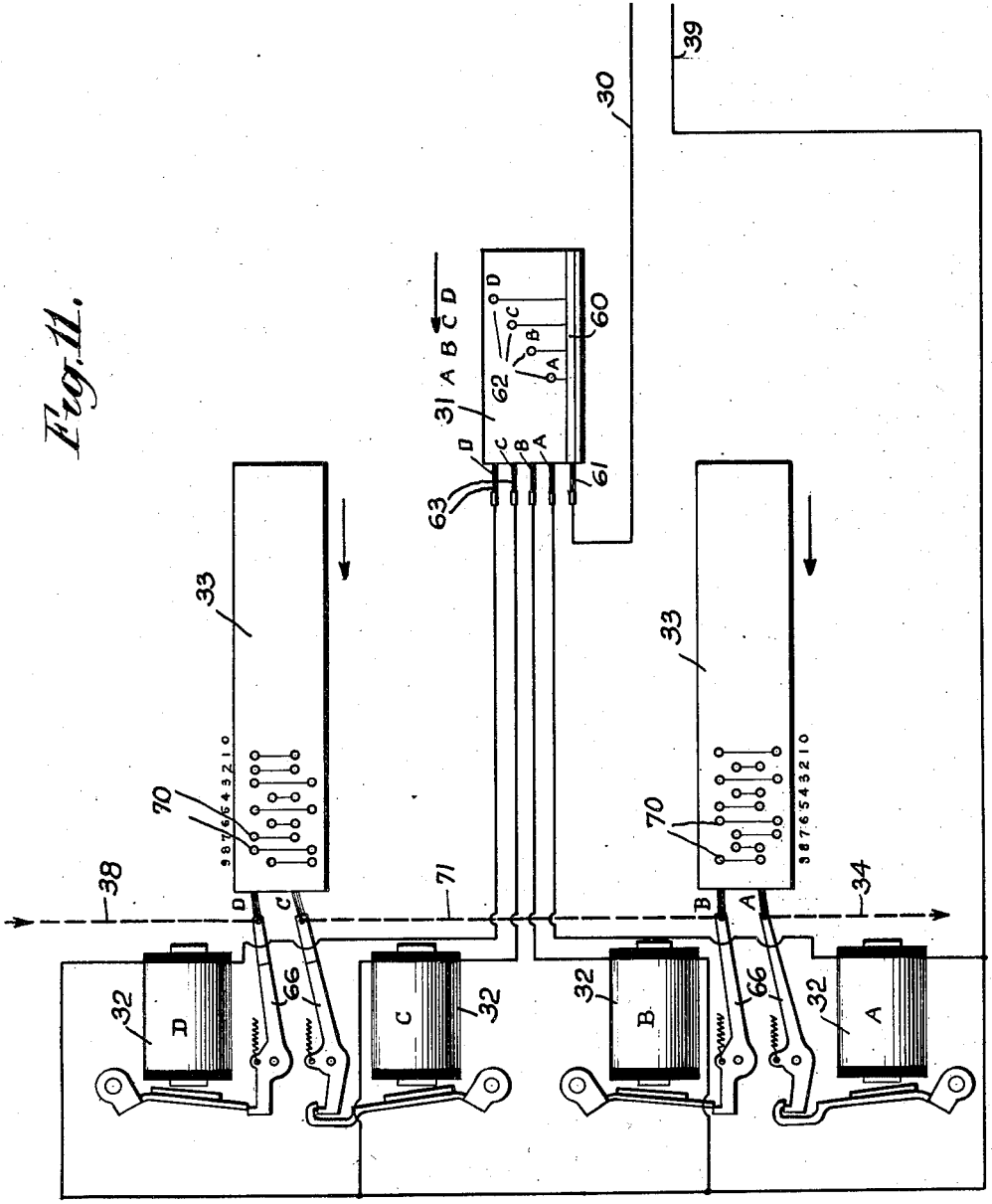

Oct. 4, 1932.                J. W. BRYCE                1,880,409
              TRANSLATING DEVICE FOR ACCOUNTING MACHINES
                    Filed Sept. 28, 1927      6 Sheets-Sheet 6

Inventor
James W. Bryce
By his Attorney
W. M. Wilson

Patented Oct. 4, 1932

1,880,409

UNITED STATES PATENT OFFICE

JAMES W. BRYCE, OF BLOOMFIELD, NEW JERSEY, ASSIGNOR TO THE TABULATING MACHINE COMPANY, OF ENDICOTT, NEW YORK, A CORPORATION OF NEW JERSEY

TRANSLATING DEVICE FOR ACCOUNTING MACHINES

Application filed September 28, 1927. Serial No. 222,464.

The invention relates to record controlled accounting machines and more particularly to translating mechanism for converting record readings of one type into readings of another type being an improvement on my prior Patent No. 1,658,024, January 31, 1928.

Accounting machines of this nature are generally controlled by record cards divided into columns in which perforations or index points may be placed to indicate different characters. The controlling cards are of two general types, in one of which only one perforation is placed in a card column and in the other of which a combination of index points may be placed in each column. Obviously the number of different characters which can be represented on cards of the first type is limited to the actual number of index point positions in a card column while on the second type of cards the number of possible characters is far in excess of the actual number of index point positions. The machines operating from the single hole cards are somewhat simpler in construction than those operating from the combination hole cards and are particularly adapted to electrical operation. It is often desirable to combine the advantages resulting from the saving in card space due to combinational hole systems with the advantages resulting from the simpler operation and construction or electrical operation of the machines operating in accordance with the system of single hole cards.

The single hole card machines are generally provided with analyzing brushes, one for each card column, beneath which the cards are passed with a continuous motion. Manifesting devices, which may be either accumulating or printing mechanisms, are driven by means operated synchronously with the feed of each card beneath the brushes and when a brush encounters a perforation a circuit is closed momentarily, the resulting current pulse either connecting the manifesting devices to or disconnecting them from their driving means. The movement of the manifesting means during the card feeding cycle is then either directly or inversely proportional to the differential location of the index point on the card and may, therefore, indicate or register the character represented by the index point.

The character meanings of combinational index points are not always fixed solely by the differential location of any one index point but often by the differential locations of several index points with respect to each other and the several index points in turn may be differentially located on the card. The problem then is to convert such readings into single timed current impulses which have the same character significance in machine operation as impulses originating from single hole cards would have.

The invention is particularly concerned with avoiding complicated circuits with their selective switches or mechanical cam and latch systems, one or the other of which have previously been essential to the proper functioning of translating mechanism of this type. Preferably this is accomplished by the use of commutator mechanism consisting generally of two commutator devices for each card column one of which will hereinafter be referred to as the reading-in commutator and the other of which will be referred to as the reading-out commutator.

The reading-in commutator rotates synchronously with the feed of the card beneath the analyzing brushes and is provided with a contact on its periphery for each index point position on the cards, the contacts being angularly displaced on the periphery so that each engages an individual brush as the corresponding index point position is being analyzed. Whenever the analyzing brush of the machine encounters a card perforation an individual circuit including one of the commutator contacts and one of the commutator brushes is closed. These circuits each include an electromagnet for shifting an individual brush associated with the reading-out commutator from which it will be understood that one of these shiftable brushes is provided for each index point position on the controlling cards.

The function of the reading-out commutator is to translate the combinational readings delivered to the translating mechanism, via the reading-in commutator, into single timed electrical impulses for operating the manifesting devices of the machine. Obviously this timing is coordinated with the drive of the manifesting devices and the rotation of the reading-out commutator may be either synchronous or non-synchronous with the card feed. The reading-out commutator is provided with two circumferential rows of contacts for each index point position on the record cards and one of the shiftable brushes normally cooperates with one row but when shifted by its magnet cooperates with the other row. The contacts are limited to an angular portion of the commutator surface leaving a blank portion to permit shifting of the brushes prior to their cooperation with the contacts. The commutator drive is arranged so that the blank portion of the surface is opposite the shiftable brushes during the entire analyzing period of each card cycle when the brushes are being shifted. The drive for this purpose may be arranged in various ways; for example, the readings may be read into the mechanism and read out in translated form during different portions of the same machine cycle or the readings may be read into the mechanism during one machine cycle and read out to control the manifesting devices during a subsequent machine cycle.

The contacts on the reading-out commutator are also arranged in transverse rows corresponding to the angular positions of the commutator in which the operating impulses to manifest the several characters must occur. Thus if the digits from 1 to 9 are to be manifested the contacts will be arranged in nine transverse rows each row corresponding to the point in the machine in which an impulse will manifest one of the digits. The adjacent contacts in the transverse rows are connected in pairs and each pair is adapted to bridge two of the shiftable brushes when the latter are in given positions. The pairs of shiftable brushes are wired in series with operating or control magnets of the manifesting devices and serve to energize them whenever each pair is bridged at the same time. Thus if a combinational index point designation on a record card represents 3, for example, the analyzing brushes of the machine cooperating with the reading-in commutator, effect shifting of a certain combination of brushes on the reading-out commutator and the transverse rows of contacts on the latter are so arranged that they will bridge the several pairs of shiftable brushes only at that point in the machine cycle at which an impulse will manifest a 3 on the associated devices. Other digits are manifested in a similar manner.

The explanation thus far has been more or less specific to a system in which a combinational index point designation for a given character will manifest that same character. But this is not essential as the particular character manifested from any shiftable brush set up depends solely on the arrangement of the contacts on the reading-out commutator in transverse rows and this arrangement may be chosen to represent an entirely different character from that causing the brush set up. Thus a combinational hole designation for 3 may be translated into 6 for entry into the manifesting devices, a combinational hole designation for 4 may be translated into 5 and so on thereby translating each character into its nine complement. Or a combinational hole designation for 3 may be translated to 9, a designation for 4 may be translated to 8 and so on thus translating to the 12 complement. On the other hand the translated data may bear a purely arbitrary, as distinguished from a logical, relationship to the original characters, for example, 3 may be translated to 5 and 4 to 9.

Furthermore the invention is particularly adapted to translate from combinational point readings to true or ten complements of the same for additive subtraction. This requires the figure in the units order of an item to be complemented to 10 and figures in all other orders to be complemented to nine. Now if the contacts on all reading-out commutators are arranged to normally complement to nine and then the commutator associated with the units order is shifted to cause its entering impulses to occur one point earlier in the machine cycle it is obvious that this commutator will translate to the ten complement and hence the true complement of each item may be obtained.

The principal object of the invention is to provide novel translating mechanism for accounting machines to translate from one type of readings to another to the end that the construction and operation of parts and the cooperation between parts may be simplified.

Another object of the invention is to provide a translating system for accounting machines to translate from one type of readings to another of increased flexibility of operation to the end that it may be readily arranged to provide for different translations.

Another object of the invention is to provide a translating system for accounting machines to translate from one type of readings to another in which a commutator device is provided to enter the readings into the translating mechanism.

Another object of the invention is to provide a translating system to translate from one type of readings to another in which a rotatable commutator device with coacting brushes shiftable transversely thereof is provided to translate and read out the entered data.

These and other objects which will be pointed out as the description proceeds will be clear from the following detailed description which should be read in connection with the accompanying drawings in which Fig. 1 is a side view of a translator unit used in the present invention for one card column;

Fig. 4 is a detail view of part of the accounting machine showing some of the adding units and the translator units and illustrating the driving connections between them;

Fig. 7 is a section on line 7—7 of Fig. 1;

Fig. 8 is a section on line 8—8 of Fig. 1 showing the construction of the reading-in commutator;

Fig. 9 is a detail section taken on the line 9—9 in front of the magnet supporting plate shown in Fig. 1;

Fig. 10 is a detail modification of certain parts of the mechanism shown in Fig. 7;

Fig. 11 is a view showing the development of the translator commutators;

Fig. 12 is a chart of the index point combinations corresponding to the designations 0 to 9;

Fig. 14 shows a control card which may be used to control the tabulating machine diagrammatically illustrated in Fig. 13.

Figure 13:
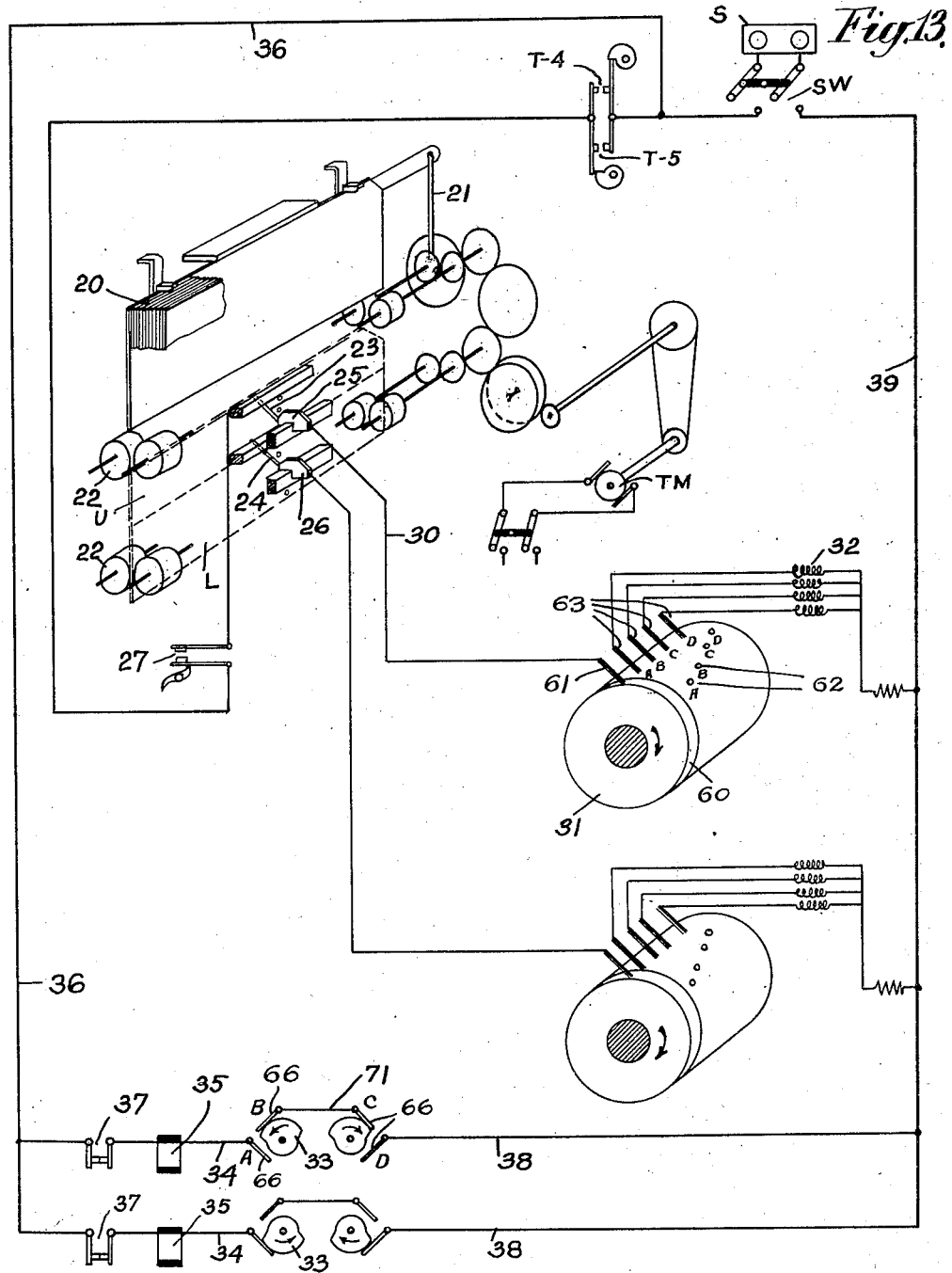
Fig. 13 is a circuit diagram of a tabulator equipped with translating mechanism according to the invention.

The operation of a well known type of tabulator which is equipped with translating mechanism according to the invention will first be briefly explained in connection with Fig. 13. A stack of combinational index point cards is diagrammatically illustrated at 20, adapted to be fed one at a time by the usual picker mechanism 21 and feed rolls 22 between analyzing brushes 23 and 24 and their cooperating contact blocks 25 and 26. The feed rolls and picker mechanism as well as the accounting and translating mechanisms of the machine are driven by a motor TM, it being understood that as long as this motor is in operation the cards 20 feed successively beneath the brushes and the translating mechanism and accounting mechanism are driven to receive character entries from the cards. Each card 20 is divided into upper and lower card fields U and L on which entirely separate character designations may be placed and the brush 23 cooperates with the upper field U while the brush 24 cooperates with the lower field L. A possible arrangement of the fields on such a card is illustrated in Fig. 14.

The control circuits of the machine are energized from a source of energy S through a double pole switch SW. The brushes 23 and 24 are connected to one side of the source of energy through card lever contacts 27 and cam contacts T—4 and T—5. The card lever contacts 27 are closed by the cards when they are passing the brushes and serve to prevent energization of the brushes in the absence of card feed. The cam contacts T—4 and T—5 cooperate to energize the brushes only when the data bearing portion of the proper field is opposite the brushes 23 and 24. That is, during a card cycle these contacts remain open until the portion L of the card feeds past the brush 23 and arrives opposite the brush 24 and remain closed until the brush 24 passes all the index point positions on the field L. The expedient of providing upper and lower card fields on the same cards has been adopted because the use of combination index points considerably reduces the extent of a card field and two fields may thus be conveniently placed on an average size card. Only one brush 23 and one brush 24 with their associated translating and data entering mechanisms have been illustrated but it will be understood that ordinarily one set of these mechanisms as illustrated will be provided for each card column; that is, there will be forty-five such mechanisms provided in the usual type of commercial machine which operates on a card having forty-five columns. As the mechanisms cooperating with the brushes 23 and 24 are identical in structure and operation the present explanation will be confined to machine control by the brush 23.

For the purpose of explaining the operation of the machine it will be assumed that the cards bear combinational index points of the Peirce type as illustrated in Fig. 12 of the drawings. Each card column is provided with four index point positions identified as A, B, C, and D and the code showing positions in which perforations must be placed to represent the ten digits from zero to nine is illustrated beneath the horizontal row of digits at the top of the chart. That is, the character 4, for example, is represented by perforations in the B and D positions, the character 5 is represented by a perforation in the C position and so on.

Referring again to Fig. 13 as the upper field U of each card feeds past the brush 23 with a continuous motion this brush makes contact instantaneously with its cooperating block 25 through each perforation which occurs in the card column thereby applying a pulse of energy for each perforation through the wire 30 to a reading-in commutator device 31 of the translating mechanism. The translator mechanism comprises in addition to the commutator 31 a set of four magnets 32 and a reading-out commutator device 33. Its function is to convert one or more pulses which it may receive from the brush 23 into a single pulse which is applied through wire 34 to counter magnet 35 of an accounting device and to properly time this single pulse to enter the character represented by the combinational index point analyzed into the accounting mechanism controlled by the magnet 35. The energizing circuit for the magnet 35 extends from one side of the source S through wire 36 and contacts 37 to magnet 35 and thence through reading-out commutators 33 and wires 38 and 39 to the other side of the source S.

The driving relationship between the counter elements of the machine and the translating units of which one is provided for each accounting unit or each card column is illustrated in Fig. 4. The accounting mechanism illustrated is similar to that in the U. S. patent to Lake #1,307,740 dated June 24, 1919, and consists of a plurality of index wheels 40 which are driven through gear trains 41 from a counter shaft 42. The counter shaft 42 is constantly rotated during data entering portions of machine cycles. One gear of each train 41 is freely mounted on shaft 42 and carries clutch teeth 43. A coacting clutch member 44 is splined to shaft 42 to rotate with it but may be shifted by a pivoted lever 45 which is urged to clutching position by the natural resiliency of one of the spring contacts 37 pressing against an insulated button on its end. The lever is normally maintained in unclutching position by a pivoted latch mechanism indicated generally at 46 which is carried on the armature of the counter magnet 35. If this magnet is momentarily energized it attracts its armature to release the latch 46 and permit the lever 45 under action of the spring contact 37 to rock about its pivot and shift the clutch sleeve 44 into clutching position thereby rotating the gear train 41 and the registering element 40 with the shaft 42. At a predetermined point in each machine cycle any clutch sleeves 44 which are in clutching position are automatically unclutched and restored to the position shown in Fig. 4 thereby arresting the motion of the registering elements 40 in their new positions. It will thus be obvious that the registering position of the elements 40 is determined by the differential time during the machine cycle when an operating pulse is supplied to the magnet 35. This accounting mechanism is fully described in the Lake patent referred to, to which reference may be had for a complete explanation of it.

The translating mechanism of which one unit 50 is provided for each card column or counter is driven from the counter shaft 42 with a two to one drive, this being indicated by the gear train 51 which drives the operating shaft 52 of the translating units. Each unit is provided with a driving gear 53 on this shaft which serves to drive all the operating mechanisms as will be hereinafter explained.

The operation of the translating mechanism in translating from combinational to single hole readings may be understood from the development diagram in Fig. 11. The reading-in commutator 31 rotates in the direction indicated by the arrow and is provided with a continuous conducting strip 60 on which rides a brush 61 connected through the wire 30 to contact block of the analyzing brush 23 of the machine (see Fig. 13). The commutator also carries on its periphery four conducting spots 62 each of which is electrically connected to the continuous strip 60 and which are spaced circumferentially and transversely of the commutator surface. An individual brush 63 coacts with each spot 62 and the circumferential spacing of the spots is such that the spot designated A makes contact with its brush 63 at the time when the analyzing brush of the machine is searching the A index point position on a card; spot 62 marked B makes contact with its brush when the analyzing brush of the machine is searching the B index point position on a card and so on. Each brush 63 is connected to an individual magnet 32 from which it follows that the magnets 32 will be energized in combinations corresponding to the index point combinations on the cards. For example, if 8 is represented on the card as indicated by perforations in the B and C positions, the corresponding B and C magnets 32 will be energized.

Each of the magnets 32 controls a shiftable brush 66 by means to be hereinafter described. When these magnets are deenergized the brushes 66 are in positions indicated on the drawings while if any magnet is energized, its corresponding brush is shifted to an alternative position. The brushes 66 ride on the surface of reading-out commutators 33. In the present case for the sake of convenience two reading-out commutators have been provided for each translating unit although obviously these could be combined into one, if desired. The reading-out commutators are provided with a blank insulating surface which is opposite the brushes 66 during that portion of a cycle in which the shiftable brushes 66 are being set up under control of the reading-in commutator. After they have been completely set up they coact with conducting spots 70 on the reading-out commutator surface. Two circumferential rows of spots 70 are provided for each brush 66, the brush coacting with one row in its normal unshifted position and cooperating with the other row when it is shifted by its magnet. These spots are also arranged in transverse rows on the commutators 33 each row including two spots electrically connected together. The transverse rows as indicated by the horizontal rows of digits above the commutators correspond to the machine positions in which impulses through the counter magnets will result in entering the digits on the registering mechanism, for example, if an impulse occurs when the 9 row of spots is under the brushes 66, 9 will be entered into the registering mechanism and so on. The brush 66 designated D is connected through wire 38 (see Fig. 13) to one side of the source of energy. The brushes 66 designated as B and C are connected together by wire 71 and the brush A is connected through wire 34 to the counter magnet 35. When the brushes 66 are in the position shown in Fig. 11 the passage of the spots 70 beneath them does not complete the entering circuit. With the particular arrangement of the spots 70, however, if any digit is represented by combinational holes in the cards 20 the brushes 66 will be shifted in combinations to cause a current impulse through the counter magnet at the proper time to enter this digit in the registering mechanism.

The operation will be clearer from a specific example. Assume that a card feeding past the brush 23 bears perforations in its B and D positions representing the character 4 (see Fig. 12). When the brush 23 encounters the index perforation in the B position the B spot 62 of the reading-in commutator 31 is under its brush 63 and a circuit is instantaneously established through the shifting magnet 32 corresponding to the B position thus shifting the brush 66 designated B from contact with the upper row of conducting spots 70 into cooperation with the adjacent row. When the brush encounters the perforation in the D position, the brush 66 designated D will be similarly shifted. By tracing the circuits in Fig. 11 it will be noted that with the B and D brushes shifted the entering circuit is completed when and only when the row of conducting spots designated 4 is under the brushes 66, the brushes designated A and B and the brushes designated C and D being bridged at this time by the connected spots 70 on the commutator 33. This results in an impulse through the counter magnet timed to enter 4 on the registering wheel. Other digits represented by combinational index perforations on the cards will result in entering the digits into the registering mechanism in a similar manner, as may be verified by comparing the chart in Fig. 12 with the shifting of the brushes 66, for each index point combination.

Figure 1:
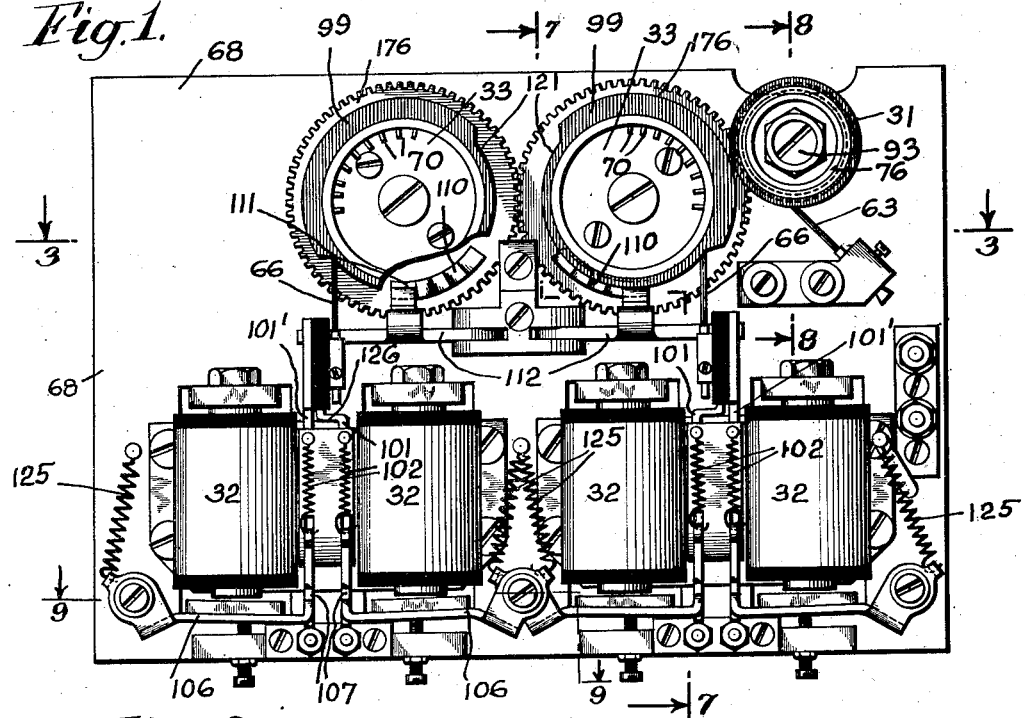
Figure 2:
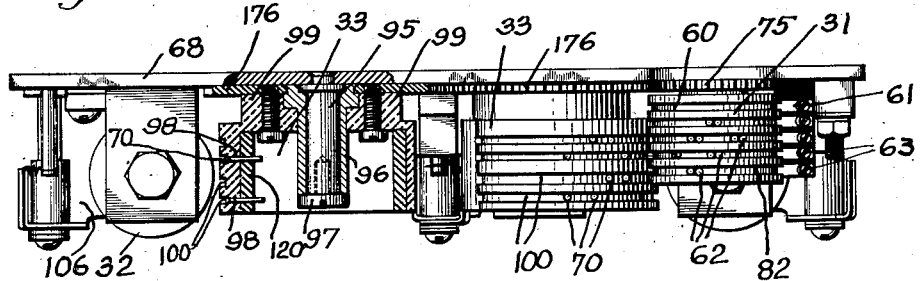
Fig. 2 is a front view thereof with some parts in section.
Figure 3:
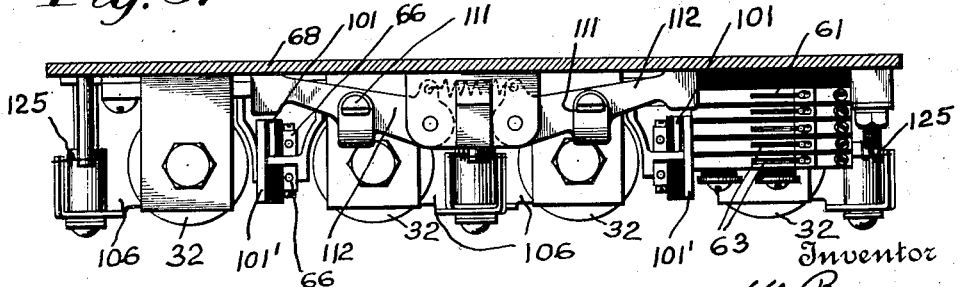
Fig. 3 is a section on line 3—3 of Fig. 1 with some parts omitted to more clearly show the construction of other parts.

The general mechanical structure of the translating mechanism may be understood from Figs. 1, 2 and 3 of the drawings in which the several elements of a translator unit are mounted on a common base plate 68. The reading-in commutator 31 carries a gear 75 meshing with a gear 53 on the drive shaft 52 (see also Fig. 4). The gear 75 also meshes with gear 176 on one of the reading-out commutators 33, this gear in turn meshing with a similar gear on the other reading-out commutator. The gear ratio between the gears 75 and 176 is two to one so that the reading-in commutator 31 makes two revolutions for each revolution of the reading-out commutators 33. The drive is also arranged so that the reading-in commutator 31 makes one revolution while the data bearing fields U and L of the record card are being completely transversed by their brushes. Every other revolution of the reading-in commutator 31 is idle as during alternate revolutions the card is feeding into position to bring its fields U and L into cooperation with the proper analyzing brushes and the contacts T—4 and T—5 in Fig. 13, are open.

The detail structure of the reading-in commutator will be best understood from Fig. 8. A stud 80 is fixed to the base plate 68 of the unit and rotatably supports the commutator structure which consists of a metallic sleeve 81 carrying the gear 75 and the insulated body portion 76 of the commutator. The commutator is provided with five circumferential grooves 82 in each of which rides one of the brushes 61 and 63. Imbedded in the insulated body portion is a flanged conducting cylinder 85 whose flange extends to the bottom of the innermost groove in which the brush 61 rides, forming the continuous conducting strip 60 of Fig. 11. The spots 62 are formed at the bottom of the four outer grooves by pins 86 electrically connected with the conducting cylinder 85. The gear 75 is countersunk and is held against the flange 88 of the metallic sleeve 71 by upsetting the sleeve as indicated at 89. The insulating body portion 76 is held against the flange 88 by a nut 90 and lock nut 91 cooperating with threads on the metallic member 81. The combined commutator structure is rotatably held on the stud 80 by a suitable screw 93 which the stud is tapped to receive.

Figure 5:
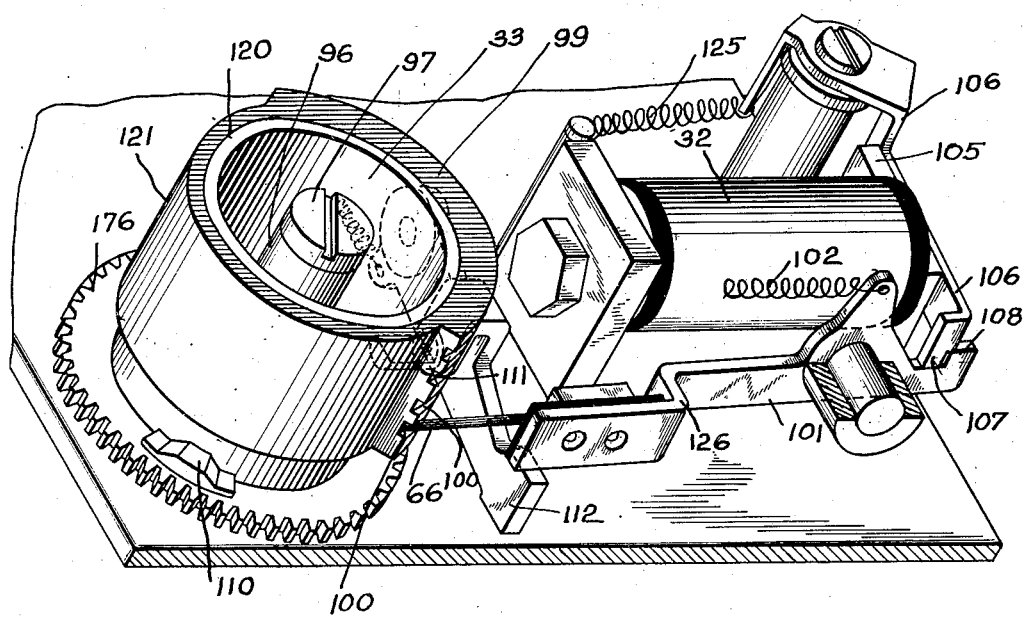
Figs. 5 and 6 are details of a reading-out commutator with the parts in different positions to illustrate the operation of the device.
Figure 6:
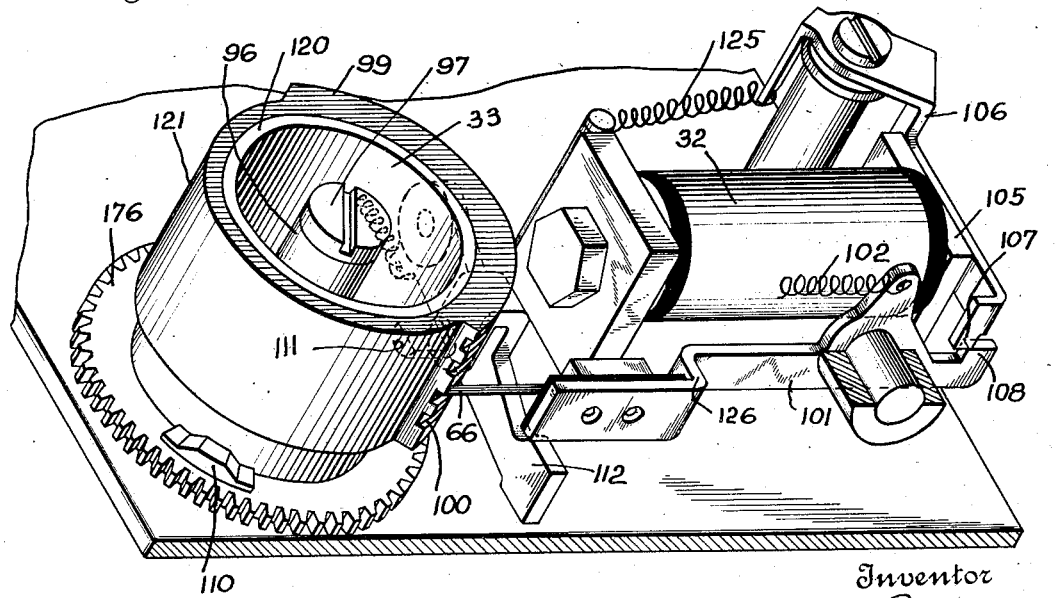

The construction of the reading-out commutators is shown most clearly in Figs. 2, 5 and 6. Each of them is rotatably supported on a stud fixed to the base plate 68 as indicated at 95 in Fig. 2. The commutator assembly consists of a flanged rotatable sleeve 96 held on the stud by a screw 97 and having the driving gear 176 and the cup shaped insulating body portion 99 rigidly supported on it. The cup shaped insulating portion is lined with a metallic conducting annulus 120 and pins 98 are set in this annulus and have their flat head portions seated at the bottom of grooves 100 to form the surface contacts 70 of the commutator. The configuration of the insulating portion 99 is clearly shown in Figs. 5 and 6. The commutator is cut away for substantially half its periphery as shown at 121 and the grooves 100 are formed in the raised portion covering substantially the other half of the periphery. In the present case four grooves 100 are formed in each of the reading-out commutators and two adjacent grooves cooperate with each of the brushes 66.

Each brush 66 of which there are two for each reading-out commutator, is supported on and insulated from a pivoted lever 101 which is urged by a spring 102 into position to cause the brush 66, to ride in the lowermost groove 100 as shown in Fig. 5. The lever 101 is normally held against the action of the spring 102 by latch mechanism, controlled by shifting magnet 32, in the position shown in Fig 6, causing the brush 66 to normally ride in the adjacent groove 100. The armature 105 of the magnet 32 is carried by a pivoted structure 106 urged by a spring 125 to the position shown in Fig. 6 whenever the magnet is deenergized. If the lever 101 is in the position shown in this figure at this time an extension 107 on the pivoted structure rides over an extension 108 on the lever and holds it against the action of the spring 102 thus holding the brush in normal position. Whenever the magnet is energized it attracts its armature 105 and rocks the supporting structure 106 to the position shown in Fig. 5, removing the extension 107 from latching engagement with extension 108 and permitting the spring 102 to move the lever 101 into the position in which the brush 66 rides in the lowermost groove 100. While only one brush 66 has been shown in Figs. 5 and 6 it will be understood that a second similar brush is operated by a similar magnet and latching mechanism to cooperate with the two upper grooves 100 in these figures.

The arrangement of magnets 32 and latching mechanisms for the two brushes is shown in Figs. 1 and 3. The entire unit is supported on a common base plate 68, the magnets 32 being placed side by side longitudinally of the plate and the axis of the commutators 33 and the plane of brushes 66 extending normal to the plate. The lever 101' to the extreme left is straight while the lever 101 next to it is offset at 126 to bring the brush 66 carried by it into alignment with that carried by the lever 101'. The lateral offset of these two brushes is provided for as shown in Figs. 3 and 7 by forming the end of lever 101' wider than the end of lever 101.

Any of the brushes 66 and levers 101 which are displaced from normal latched position are automatically restored after the brushes leave the grooves 100 and prior to subsequent energization of any of the magnets 32 under control of the reading-in commutator. The restoring mechanism (Figs. 5 and 6) consists of a pivoted arm 112 whose free end underlies the ends of levers 101 and 101' (see also Figs. 1 and 3). Intermediate its ends this arm carries a pin 111 which at the proper time in each cycle is engaged by a cam 110 on driving gear 176 to rock the arm. If either of the levers 101 or 101' is displaced from normal position it will be restored by this rocking of the arm 112 to permit latching engagement of the extensions 107 and 108. Thereafter the levers remain in normal latched position until their magnets 32 are again energized to release the latching mechanism.

A modification of the latching mechanism is illustrated in Fig. 10. In this form the parts corresponding to those in the other figures are represented by the same reference characters with the letter $a$ added. The lever 101$a$ carrying the brush 66$a$ is provided with an additional extension 131 lying in the plane of an extension 130 on the armature supporting structure 106$a$. When the structure 106$a$ rocks in response to attraction of the armature by the shifting magnet the extension 130 encounters the extension 131 and assists the spring 10 in shifting the brush 66$a$ to its new position. This provides for a positive shifting of the brush which is lacking in the other modification.

The brush mechanism and restoring mechanism as just described applies to the left hand reading-out commutator 33 in Fig. 1. An inspection of Figs. 1 and 3 shows that exactly similar mechanisms are provided for the right hand commutator 33 but as the operation and construction of the mechanisms are substantially the same as that just explained the explanation will not be repeated with reference to them.

The complete operation of entering a character designation from a card into the translating device and thence in its translated form to the accounting device may be briefly summarized. Assume a card to be in the process of having the index points in its upper field U analyzed by the brush 23 (Fig. 13). While this complete analysis is in progress the shiftable brushes 66 (Figs. 1, 5 and 6) of the reading-out commutators are opposite the cut away portion 121 of the commutator and are freely shifted under conjoint control of the analyzing brush 23 and the reading-in commutator 31 in accordance with the character designation. This occurs during one revolution of the reading-in commutator 31 and one half revolution of the reading-out commutator 33 at the end of which the brushes 66 are completely set up in accordance with the character designation on the card and are adapted to enter certain selected grooves 100 (Figs. 5 and 6). During the following revolution of the reading-in commutator the brushes ride into the grooves, translate the combination reading into the desired character impulse and cause its entry into the accounting mechanism. The reading-in commutator is inactive during this revolution as the card which has just been analyzed is feeding out of the analyzing mechanism, its upper field U (Fig. 13) passing the analyzing brush 24, and consequently the cam contacts T—4 and T—5 are open to prevent energization of the analyzing brushes 23 and 24. There is therefore no possibility of an attempt to shift the brushes 66 on the reading-out commutators. During this time also the following card is feeding to analyzing position its lower field L passing the analyzing brush 23. At the end of this revolution of the reading-in commutator the cam 110 (Figs. 5 and 6) restores all brushes 66 to normal latched position in condition for receiving and translating another combinational reading. The following record card has now been fed into true analyzing position to have its upper field U analyzed by the brush 23 and its lower field L analyzed by the brush 24 and the cam contacts T—4 or T—5 close. During the following revolution of the reading-in commutator the sequence of operation begins again to translate the data on this following card.

It is not essential that the readings taken from record cards be entered into the accumulating or manifesting mechanisms in their true actual values. Referring to Fig. 11 it will be noted that the brushes 66 are shifted in given combinations for each index combination on a card. The readings which are entered into the manifesting devices, however, depend on the arrangement of the contacts 70 on the reading-out commutators and the meanings may be entirely transposed by rearranging these contacts. The most common transposition desired is from actual numbers as represented on the cards into nine complements of the same. This may be accomplished by merely reversing the order of the transverse rows of contacts shown in Fig. 11, that is the blank row designated 0 should occur in the nine position; the row designated 1 should occur in the eight position and so on. Then an impulse in the eight position would result from a card combination representing one on a card; an impulse in the seven position would result from a card combination representing two and so forth, thus translating each character on a card into its nine complement.

The entry of complements in this fashion is most useful in additive subtraction in which the true or ten complement of each item to be subtracted is entered into the accumulators and added, the result in actual numbers representing a difference. The true complement of an item is obtained by complementing the figure in the units order to ten and the figures in all other orders to nine. Such true complements may be obtained directly from the present translating mechanism. If the transverse rows of contacts 70 are reversed, as just explained to obtain nine complements, it is only necessary to shift the units order reading-out commutator one point ahead in the machine cycle so that the impulse obtained from each transverse row of contacts 70 in the units order occurs one point sooner in the cycle than it would ordinarily. This will automatically enter the ten complement in the units order and the nine complement in every other order or in other words entering the true complement of each item.

The transverse rows of contacts 70 may also be rearranged in order to obtain complements to any number other than nine or ten or to obtain purely arbitrary transpositions. If it were desired to obtain the twelve complements of each digit the rows would be rearranged so that each impulse resulting from a given digit on a card would represent the difference between twelve and that digit. That is the row designated nine in Fig. 11 would be placed in the three position and so on. If a purely arbitrary translation were required such as, for example, translating each six on a card to three for entry into the manifesting device and from seven to five it would only be necessary to place the row of contacts designated 6 in Fig. 11 in the 3 position and the row designated 7 in the 5 position.

The invention has now been described in connection with a particular mechanical and electrical arrangement and several of its uses indicated. It is to be understood that many modifications in the structure and operation and many additional uses will readily occur to those skilled in the art and I intend to be limited only as indicated by the scope of the following claims:

1. An accounting machine including data entering means for entering data in accordance with one type of character designation and entry receiving means operating in accordance with another type of character designation in combination with translating mechanism comprising a reading-in commutator for receiving the one type of character designations from the data entering means and reading-out mechanism comprising settable devices controlled by the commutator and means cooperating with the settable devices for translating the received designations into designations of the other type and entering them into the entry receiving means.

2. An accounting machine including data entering means for entering data in accordance with one type of character designation and entry receiving means operating in accordance with another type of character designation in combination with translating mechanism comprising a rotatable reading-in commutator and stationary brushes coacting therewith and with the data entering means for receiving the one type of character designations and reading-out mechanism comprisin commutator and means cooperating with the settable devices for translating the received designations into designations of the other type and entering them into the entry receiving means.

3. An accounting machine including data entering means operating in accordance with one type of character designation and entry receiving means operating in accordance with another type of character designation in combination with translating mechanism comprising reading-in mechanism for receiving designations of the one type from the data entering means and reading-out mechanism comprising a rotatable commutator with brushes shiftable transversely thereof and controlled by the reading-in mechanism to translate the received designations into designations of the other type and enter them into the entry receiving means.

4. An accounting machine including data entering means operating in accordance with one type of character designation and entry receiving means operating in accordance with another type of character designation in combination with translating mechanism comprising reading-in mechanism for receiving designations of the one type from the data entering means and reading-out mechanism consisting of a rotatable commutator and a plurality of brushes shiftable transversely of the commutator with an individual shifting magnet for each brush controlled by the reading-in mechanism to translate the received designations into designations of the other type and enter them into the entry receiving means.

5. An accounting machine including data entering means operating in accordance with one type of character designation and entry receiving means operating in accordance with another type of character designation in combination with translating mechanism comprising reading-in means for receiving designations of the one type from said data entering means and including a reading-in commutator with a plurality of reading-in brushes and reading-out mechanism including a rotatable commutator and brushes shiftable transversely thereof, an individual magnet controlled by one of said reading-in brushes for each shiftable brush, to shift the same in accordance with received data designations, said reading-out commutator and said shiftable brushes cooperating to translate the received character designations into designations of the other type and enter them into the entry receiving means.

6. A record controlled accounting machine for operating upon combinational index point records and translating the readings thereon into single timed operations comprising record analyzing means, a commutator controlled thereby and settable means controlled by the commutator to effect setups corresponding to the readings and timed mechanism cooperating with the settable devices for converting the setups into timed operations.

7. A record controlled accounting machine for operating upon combinational index point records and translating the readings thereon into single timed operations comprising record analyzing means, a plurality of brushes associated therewith, a rotatable commutator cooperationg with the brushes and settable means controlled by the commutator to effect setups corresponding to the readings and timed mechanism cooperating with the settable devices for converting the setups into timed operations.

8. A record controlled accounting machine for operating upon combinational index point records and translating the readings thereon into single timed current impulses comprising record analyzing means, a commutator device controlled thereby and settable means controlled by the commutator device to effect setups corresponding to the readings and a second commutator device cooperating with said settable means for converting the setups into single timed current impulses.

9. A record controlled accounting machine for operating upon combinational index point records and translating the readings thereon into single timed current impulses comprising record analyzing means, a rotatable commutator and brushes shiftable transversely thereof under control of said analyzing means in accordance with combinations of index points on the records to convert the readings into single timed current impulses.

10. A record controlled accounting machine for operating upon combinational index point records and translating the readings thereon into single timed current impulses comprising record analyzing means, a rotatable commutator and brushes shiftable transversely thereof in combinations corresponding to different possible index point combinations on the records to effect single timed current impulses for the different combinations and electromagnetic means controlled by the analyzing means for shifting said brushes.

11. A record controlled accounting machine for operating upon combinational index point records and translating the readings thereon into single timed current impulses comprising record analyzing means, a first commutator device, a second rotatable commutator device with brushes shiftable transversely thereof under conjoint control of said analyzing means and said first named commutator device in combinations corresponding to the index-point designations on controlling records and contacts on said second named commutator device cooperating with the brushes in their several positions to initiate timed current impulses from the combinational brush settings.

12. A record controlled accounting machine for operating upon combinational index point records and translating the readings thereon into single timed current impulses comprising analyzing means for searching combinational index point designations on moving records, a commutator device controlled by said analyzing means and settable means controlled by the commutator device effecting setups corresponding to the index point combinations on the moving record and means for translating said setups into timed current impulses.

13. A record controlled accounting machine for operating upon combinational index point records and translating the readings thereon into single timed current impulses comprising analyzing means for searching combinational index points on records while they are in motion, a rotatable commutator and brushes shiftable transversely thereof under control of said analyzing means in accordance with index point designations, said commutator cooperating with said shiftable brushes to initiate current impulses differently timed for different brush combinations.

14. A record controlled accounting machine for operating upon combinational index point records and translating the readings thereon into single timed current impulses comprising analyzing means for searching combinational index points on records while they are in motion, a rotatable commutator and brushes shiftable transversely thereof in combinations according to different index point combinations on the records and a magnet controlled by the analyzing means for effecting shifting of each brush, said commutator cooperating with the brushes as shifted to initiate current impulses differently timed for different brush combinations.

15. A record controlled accounting machine for operating upon combinational index point records and translating the readings thereon into single timed current impulses comprising analyzing means for searching combinational index points on records while they are in motion, a first commutator device and a second rotatable commutator device with brushes shiftable transversely thereof under conjoint control of said analyzing means, and said first commutator device in accordance with combinational index point readings on the records and contacts on the second commutator device coacting with the shiftable brushes in their different positions to initiate current impulses differently timed for different brush shiftings.

16. A record controlled accounting machine for operating upon combinational index point records and translating the readings thereon into single timed current impulses comprising analyzing means consisting of a single brush for each card column, a commutator with contacts thereon connected to an analyzing brush, brushes coacting with said commutator to progressively effect a setup corresponding to a combination on a controlling record and means for translating said setup into a timed current impulse.

17. A record controlled accounting machine for operating upon combinational index point records and translating the readings thereon into single timed current impulses comprising analyzing means consisting of a single brush for each record column to successively analyze the index points of a combination, a rotatable commutator with coacting brushes and having contacts thereon connected to an analyzing brush and spaced to successively engage the commutator brushes as the index points of a combination are analyzed, means controlled conjointly by said analyzing brush and said commutator to effect setups corresponding to index point combinations analyzed and means for converting said setups into single timed current impulses.

18. A record controlled accounting machine for operating upon combinational index point records and translating the readings thereon into single timed current impulses comprising analyzing means consisting of a single brush for each record column to successively analyze the index points of a combination, a rotatable commutator with coacting brushes and having contacts thereon connected to an analyzing brush and spaced to successively engage the commutator brushes as the index points of a combination are analyzed, means controlled by said analyzing brush and said commutator to effect setups corresponding to index point combinations analyzed, and means comprising a commutator for converting said setups into single timed current impulses.

19. A record controlled accounting machine for operating upon combinational index point records and translating the readings thereon into single timed current impulses comprising analyzing means consisting of a single brush for each record column to successively analyze the index points of a combination, a rotatable commutator with coacting brushes equal in number to the index point positions in a record column, a contact on said commutator for each brush and spaced to engage its brush as the analyzing brush searches a corresponding index point position, a second commutator with brushes shiftable transversely thereof and equal in number to the brushes of the first commutator and electromagnetic means controlled conjointly by the analyzing brush and the first named commutator to shift the shiftable brushes in accordance with index point combinations, said second commutator being provided with contacts to engage the shiftable brushes in their different positions at different times according to the index point combinations effecting the shifting.

20. A record controlled accounting machine for operating upon combinational index point records and translating the readings thereon into single timed current impulses comprising analyzing means consisting of a single brush for each record column to successively analyze the index points of a combination, a first rotatable commutator with coacting brushes equal in number to the index point positions on a record, a contact on said commutator for each brush connected to the analyzing brush and spaced to engage its brush as the analyzing brush searches the corresponding index point position, a second rotatable commutator with brushes shiftable transversely thereof and equal in number to the brushes of the first commutator, a shifting magnet for each shiftable brush individually connected to one of the brushes of the first commutator to be shifted in accordance with index point combinations on records, a circuit extending in series through said shiftable brushes and contacts on said second commutator to close said circuit momentarily through the shiftable brushes at different times corresponding to the settings thereof.

21. An accounting machine including data entering means operating in accordance with one type of character designation and entry receiving means operating in accordance with another type of character designation in combination with translating mechanism comprising reading-in mechanism for receiving designations of the one type from the data entering means and reading-out mechanism comprising a rotatable commutator with brushes shiftable thereon to different positions and controlled by the reading-in mechanism to translate the received designations into designations of the other type and enter them into the entry receiving means.

22. An accounting machine including data entering means operating in accordance with one type of character designation and entry receiving means operating in accordance with another type of character designation in combination with translating mechanism comprising reading-in mechanism for receiving designations of the one type from the data entering means and reading-out mechanism consisting of a rotatable commutator and a plurality of brushes shiftable thereon, and a shifting magnet for each brush controlled by the reading-in mechanism to translate the received designations into designations of the other type and enter them into the entry receiving means.

In testimony whereof I hereto affix my signature.

JAMES W. BRYCE.